Figure 1:
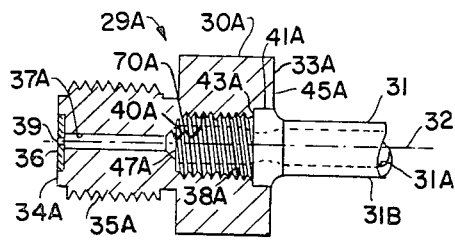
Figure 2:
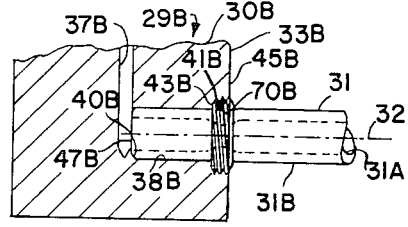
Figure 3:
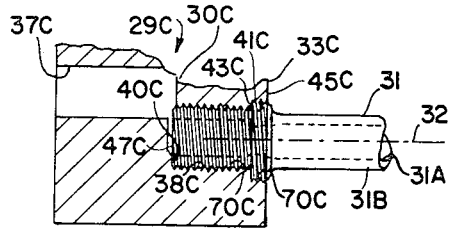
Figure 4:
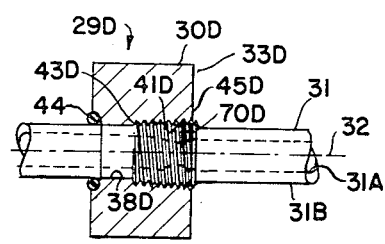

United States Patent [19]

Ridenour

[11] 4,262,942

[45] * Apr. 21, 1981

[54] TUBE FITTING ASSEMBLY WITH SHOULDER MEANS

[75] Inventor: Ralph G. Ridenour, Mansfield, Ohio

[73] Assignee: Universal Enterprises, Inc., Mansfield, Ohio

[*] Notice: The portion of the term of this patent subsequent to Apr. 29, 1997, has been disclaimed.

[21] Appl. No.: 942,889

[22] Filed: Sep. 18, 1978

Related U.S. Application Data

[60] Division of Ser. No. 657,060, Feb. 11, 1976, Pat. No. 4,126,929, which is a continuation-in-part of Ser. No. 554,395, Mar. 3, 1975, Pat. No. 3,977,710, which is a continuation-in-part of Ser. No. 425,561, Dec. 17, 1973, abandoned.

[51] Int. Cl.³ .................................................. F16L 13/14
[52] U.S. Cl. ................................. 285/382.5; 29/523
[58] Field of Search ............... 285/382.5, 382.4, 382; 29/523

[56] References Cited

U.S. PATENT DOCUMENTS

| 1,776,615 | 9/1930 | Boothman et al. | 285/382 X |
| 2,434,080 | 1/1948 | Rosa | 285/382.5 X |
| 2,463,883 | 3/1949 | Kinsey | 285/382.5 X |
| 3,711,132 | 1/1973 | Nickerson | 285/382.4 X |
| 3,817,562 | 6/1974 | Cook et al. | 285/382.5 X |
| 3,940,168 | 2/1976 | Balon | 285/382 X |

FOREIGN PATENT DOCUMENTS 688579  3/1953  United Kingdom ................ 285/382.5

Primary Examiner—Thomas F. Callaghan
Attorney, Agent, or Firm—Pearne, Gordon, Sessions, McCoy & Granger

[57] ABSTRACT

A tube fitting assembly is disclosed comprising a fitting having a first orifice through a portion of the fitting and a second orifice larger than the first orifice and coaxial with and through a portion of the first orifice. The second orifice extends from an outside surface of the fitting. One of the first and second orifices contains a shoulder defining areas of different cross-sectional areas within that orifice. The shoulder includes a shoulder surface facing axially inwardly relative to the outside surface of the fitting. A tubing having a diameter substantially equal to the first orifice occupies the first and second orifices with a first deformed portion formed from a radially expanded tubing wall engaging the other of the first and second orifices. The tubing has a second deformed portion from first and second parts of the tubing inside wall axially contracted and folded into engagement with each other to provide radial expansion of the tubing wall engage the shoulder surface to seal the tubing to the fitting and preventing axial separation of the tubing from the fitting. The foregoing is merely a resume of one general application, is not a complete discussion of all principles of operation of applications, and is not to be construed as a limitation on the scope of the claimed subject matter.

22 Claims, 12 Drawing Figures

U.S. Patent  Apr. 21, 1981  4,262,942 surface 57B. The sealing bead means 70D is locked between the inwardly and outwardly facing shoulder means to prevent axial separation of the tubing 31 from the fitting 30. Generally, complete seals are formed between a plurality of adjacent inwardly and outwardly facing shoulder surfaces. The seal formed by this structure may be considered to be a plurality of seals between adjacent threads of a helical thread or may be considered to be a helical seal along the path of the thread.

Figure 5:
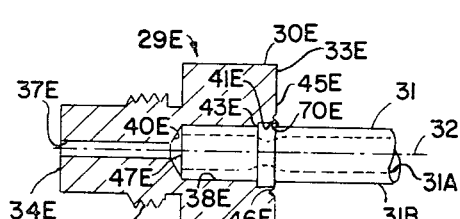
Figures 6, 7:
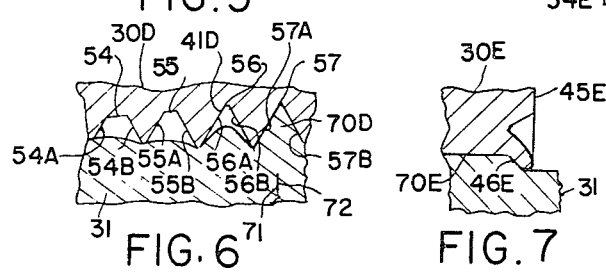

The embodiment shown in FIGS. 5 and 7 represents an annular sealing bead means whereas the embodiments shown in FIGS. 1-4 are helical sealing bead means. The peripheral sealing bead means 70E in FIG. 7 is annular in shape and is locked between the inwardly facing shoulder means 46E and the outwardly facing shoulder means 43E.

In my prior U.S. Pat. No. 3,930,298; I disclosed a tube fitting assembly and Method of making thereof which was readily adaptable to small diameter tubing, for example; 0.125 inches (3.2 mm) outside diameter (O.D.). In my continuation-in-part application, now U.S. Pat. No. 3,977,710, issued Aug. 31, 1976, I disclosed an invention which was more suitable for larger diameter tubing for example, ⅜ inches (O.D.) or 9.5 millimeters (O.D.). With the invention described in U.S. Pat. No. 3,977,710, tube fitting assemblies were produced that sealed under pressure tests of one thousand pounds per square inch (p.s.i.) at a temperature of 650° F. The present invention discloses a tube fitting assembly and method of making thereof which is more adaptable for a wider variety and size of tubing than heretofore possible in either of my prior inventions. These tube fitting assemblies exhibit extraordinary strength and resistance to vibration as consistent with my inventions of the past.

The present invention incorporates the rotational strength of my prior inventions U.S. Pat. No. 3,930,298, issued Jan. 6, 1976 and U.S. Pat. No. 3,977,710, issued Aug. 31, 1976 which are incorporated by reference herein. The instant invention provides a superior axial strength to prevent the tubing 31 from separating from the fitting 30 along axis 32.

The invention has been set forth in the preferred form as a tube fitting assembly 29 comprising the fitting 30 having an outside surface 45 and a first orifice 38. The first orifice 38 extends through at least a portion of the fitting 30. The fitting 30 has a second orifice 41 which extends from the outside surface 45 of the fitting 30 through at least a portion of the first orifice 38. The first and second orifices 38 and 41 may be tapered and may exhibit various cross-sectional shapes. One of the first and second orifices 38 and 41 has shoulder means defining areas of greater cross-sectional area in the orifice than another portion of the orifice.

The tubing has an inside surface 31A and an outside surface 31B and is disposed within the first and second orifices 38 and 41. A peripheral sealing bead means 70 extends around the periphery of the outside tubing wall 31B with a first and a second portion 71 and 72 in FIG. 6 of the inside tubing wall axially contacting one another. Radially expanded first and second portions of the outside wall 31A of the tubing 31 establish a sealing engagement with the first and second shoulder surfaces 57A and 57B as shown in FIG. 6.

Figure 8:
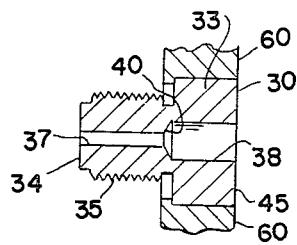
Figure 9:
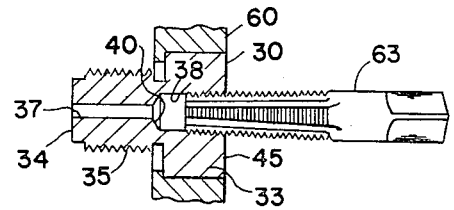
Figure 10:
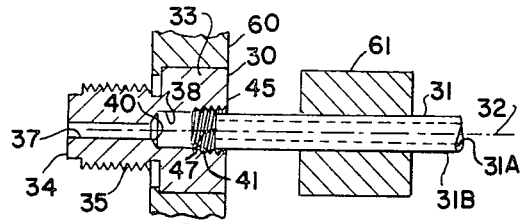

The invention embodied in the tube fitting assemblies shown in FIGS. 1-7 also resides in the method of making the tube fitting assembly which is shown in FIGS. 8-12. FIG. 8 shows the first step in the method of forming a tube fitting assembly; namely holding the fitting 30 with holding dies 60. The fitting 30 in FIG. 8 has only a first orifice 38 and the second orifice 41 has yet to be formed. The second step of the process includes forming shoulder means in one of the first and second orifices having an inwardly facing shoulder surface and an outwardly facing shoulder surface relative to the outside surface 45 of the fitting 30. FIG. 9 illustrates the step of forming the shoulder means by tapping the fitting 30 held in the fitting holder 60. A tap 63 which forms the shoulder means also forms the second orifice 41. However, the second orifice 41 can be preformed, as would be the case with the bodies of FIGS. 2 and 3. FIG. 10 illustrates the steps of holding the tubing 31 with tubing holder dies 61 and inserting the tubing end 47 into the first orifice 38 of the fitting 30. The axial relative movement between the fitting holding dies 60 and the tubing holding dies 61 results in the tubing end engaging the inside surface of the fitting at the termination of the first orifice 38. The process includes securing the tubing end 47 relative to the fitting 30 to prevent relative movement therebetween. This securing may be accomplished by inserting the tubing end 47 to abut the inside surface 40 of the fitting 30 to prevent relative movement between the tubing end 47 and the inside surface 40. The securing of the tubing end may be done by other means such as a die or mechanical stop for forming the fitting shown in FIG. 4.

Figure 11:
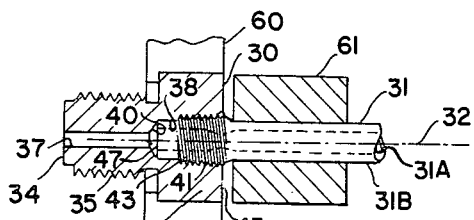

FIG. 11 illustrates the axial contraction of the tubing length between the tubing end 47 and the tubing holding die 61 by relative movement between the tubing holding die 61 and the fitting holding die 60. The axial contraction of the tubing length causes radial expansion of the tubing wall to form a bead of the material of the contracted tubing length within the orifices. The radial expansion of the bead through continued contraction of the tubing length substantially fills the second orifice radially outwardly from the inside wall of the tubing to engage the shoulder surface. The force applied between the fitting holder 60 and the tubing holder 61 is in excess of 1,000 pounds. Applied to a tubing having an 0.125 inch O.D. and a 0.035 inch wall thickness results in a pressure in excess of 100,000 pounds per square inch.

During the axial contraction of the tubing wall, the inside wall surface 31A of the tubing 31 bulges inwardly. It is believed that this inward bulge aids the outward radial expansion of the tubing wall.

Figure 12:
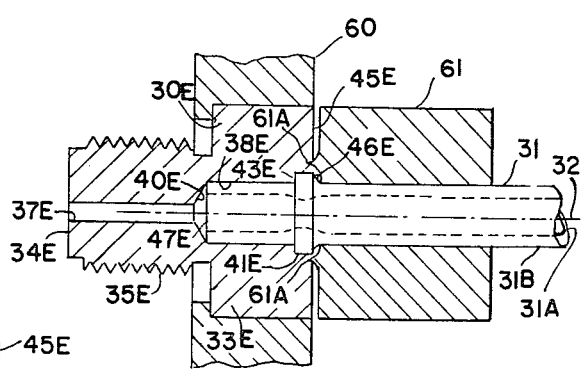

FIG. 12 illustrates an alternate method of forming the inwardly facing shoulder surface 46E which includes striking the outside surface 45E of the fitting 30E about the second orifice 41E. The deformation of the fitting 30E produces the shoulder surface 46E within the second orifice 41E. The step of striking the surface may be accomplished by an annular projection 61A on the front surface of the tubing holding die 61. The step of striking may be consumated at the sequence shown at FIG. 9 or may be consumated at the sequence shown at FIG. 12 after partial or total radial expansion of the bead. The advancement of this invention over the prior art can best be appreciated in view of the pressure tightness and mechanical strength of the tube fitting assembly. Much of the strength is attributed under present understanding, to the first and second orifices of different cross-sectional areas in addition to the inwardly and outwardly facing shoulder means which prevent axial separation of the fitting and the tubing.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

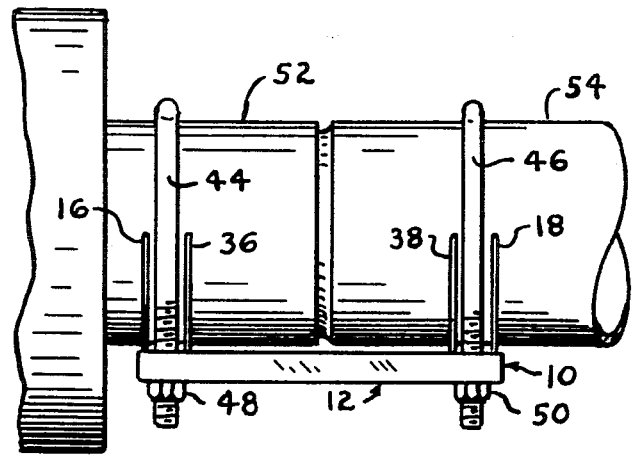

What is claimed is:

1. A tube fitting assembly comprising in combination:
   a fitting having an outside surface and a first surface defining a first orifice through at least a portion of said fitting;
   said fitting having a second surface defining a second orifice through at least a portion of said first orifice and extending from said outside surface of said fitting;
   said second orifice having a greater cross-sectional area than said first orifice;
   one of said first and second orifices having inwardly and outwardly facing shoulder means defining areas of different cross-sectional area within said one of said first and second orifices;
   a tubing having an inside and an outside tubing wall disposed in said orifices of said fitting;
   and peripheral sealing bead means extending around the periphery of and unitary with said outside tubing wall;
   said sealing bead means including first and second portions of said tubing inside wall axially contracted and folded into engagement with each other;
   said sealing bead means including radially expanded first and second portions of said tubing outside wall in the area of said folded inside wall to establish sealing engagement with at least one of said inwardly and outwardly facing shoulder means
   said sealing bead means being in tight engagement with said second surface of said second orifice,
   said tube fitting having a given number of substantially helical threads forming said inwardly and outwardly facing shoulder means,
   said tube having an initially unthreaded annular area with first and second adjacent parts,
   said second part being part of said sealing bead means radially expanded into tight engagement with the roots of said threads and said first part being expanded into engagement with the crests of said threads but not into engagement with the roots of said threads.

2. A tube fitting assembly as set forth in claim 1, wherein said sealing bead means is helical.

3. A tube fitting assembly as set forth in claim 1, wherein said sealing bead means includes a tight engagement with both said inwardly and outwardly facing shoulder means.

4. A tube fitting assembly as set forth in claim 1, wherein said sealing bead means includes said first and said second portions of said tubing outside wall being in tight engagement with said inwardly and outwardly facing shoulder means.

5. A tube fitting assembly comprising in combination:
   a fitting having a first internal orifice extending through at least a portion of said fitting;
   said fitting having a second internal orifice extending through at least a portion of said first internal orifice from an outside surface of said fitting;
   said second internal orifice including portions thereof having a greater cross-sectional area than the cross-sectional area of portions of said first internal orifice;
   thread means having a given number of substantially helical threads extending through at least a portion of one of said first and second internal orifices;
   said thread means defining a portion of said one of said first and second internal orifices to have a greater cross-sectional area than another portion of said one of said first and second internal orifices;
   a tubing having an inside and an outside wall disposed within said first and second orifices;
   a first tube fitting engagement including an outside surface of said tubing engaging at least a portion of the other of said first and second internal orifices;
   peripheral sealing bead means extending around the periphery and unitary with said tubing outside wall and disposed radially outwardly from two parts of said tubing inside wall in mutual engagement;
   a second tube fitting engagement including said outside wall of said tubing at said peripheral sealing bead means being radially expanded into engagement with said thread means forming a helical seal along at least a portion of said thread means,
   said tube having an initially unthreaded annular area with first and second adjacent parts,
   said second part being part of said sealing bead means radially expanded into tight engagement with the roots of said threads and said first part being expanded into engagement with the crests of said threads but not into engagement with the roots of said threads.

6. A tube fitting assembly as set forth in claim 5, wherein said thread means is formed in said first orifice only.

7. A tube fitting assembly as set forth in claim 5, wherein said thread means is formed in said second orifice only.

8. A tube fitting assembly as set forth in claim 5, wherein said thread means is formed in both said first and second orifices.

9. A tube fitting assembly comprising, in combination:
   a fitting having a first wall defining a first orifice through at least a portion of said fitting,
   said fitting having a second wall defining a second orifice extending along at least a portion of said first orifice,
   said second orifice having a greater cross-sectional area than said first orifice,
   a tube having an inner and an outer tube wall with the outer tube wall of a first portion of said tube having an outer cross-sectional area substantially equal to said first orifice and being disposed in said first orifice,
   one of said orifices having substantially helical threads to form inwardly and outwardly facing shoulders,
   seal means including a second portion of said tube longitudinally compressed to have two annular parts of said inner tube wall in mutual engagement to establish a radially expanded bead portion of the outer tube wall acting against and being radially restrained by said second wall of said fitting and forming a fluid seal relative to said fitting, retention means including a radially expanded portion of said tube wall acting against said inwardly facing shoulder, said tube having an initially unthreaded annular area with first and second adjacent parts, said second part being part of said sealing bead means radially expanded into tight engagement with the roots of said threads and said first part being expanded into engagement with the crests of said threads but not into engagement with the roots of said threads.

10. A tube fitting assembly as set forth in claim 9, wherein said retention means is established adjacent a longitudinally facing shoulder of said fitting.

11. A tube fitting assembly as set forth in claim 9, wherein said retention means acts between a longitudinally facing shoulder on said fitting and a longitudinally facing shoulder on said tube.

12. A tube fitting assembly as set forth in claim 9, wherein said second orifice extends to an outer surface of said fitting, and said radially expanded bead portion is exposed adjacent said outer surface of said fitting.

13. A tube fitting assembly as set forth in claim 9, wherein said retention means includes a third wall in said fitting defining a third orifice smaller in cross-sectional area than said second orifice and disposed between said second wall and an outer surface of the fitting.

14. A tube fitting assembly as set forth in claim 13, wherein said retention means includes an inwardly facing shoulder between said second and third walls and engaging an outer surface on said tube.

15. A tube fitting assembly as set forth in claim 9, wherein said fitting has an outer surface surrounding said second orifice, and said second orifice extends to said outer surface.

16. A tube fitting assembly as set forth in claim 9, wherein said retention means is disposed between said inwardly and outwardly facing shoulders.

17. A tube fitting assembly as set forth in claim 9, wherein said retention means includes said radially expanded bead portion.

18. A tube fitting assembly as set forth in claim 9, wherein said retention means includes said radially expanded bead portion acting against said inwardly and outwardly facing shoulders.

19. A tube fitting assembly as set forth in claim 9, wherein said radially expanded bead portion is exposed at an outer surface of said fitting, and said inwardly facing shoulder is in said first orifice.

20. A tube fitting assembly as set forth in claim 19, wherein said second orifice is cylindrical.

21. A tube fitting assembly as set forth in claim 19, wherein said second orifice also contains an inwardly facing shoulder.

22. A tube fitting assembly as set forth in claim 9, wherein said first orifice is cylindrical.

* * * * *

United States Patent [19]

Armstrong

[11] 4,262,943
[45] Apr. 21, 1981

[54] MUFFLER CLAMP DEVICE

[76] Inventor: William J. Armstrong, Box 176, Lake Village, Ind. 46349

[21] Appl. No.: 36,577

[22] Filed: May 7, 1979

[51] Int. Cl.³ .............................................. F16L 13/14
[52] U.S. Cl. ........................................ 285/420; 24/277
[58] Field of Search ................. 285/420, 21, 22, 61, 285/382.2, 382; 248/49, 74 R, 671, 678; 24/277, 284

[56] References Cited

U.S. PATENT DOCUMENTS

| | | | |
|---|---|---|---|
| 749,391 | 1/1904 | Lutz | 285/420 X |
| 1,682,693 | 8/1928 | Day | 285/61 X |
| 1,999,791 | 4/1935 | Siegfried | 248/49 |
| 3,565,465 | 2/1971 | Wemyss | 285/420 X |
| 3,937,499 | 2/1976 | Courtot | 285/61 X |
| 4,012,470 | 3/1977 | Thayer | 248/74 R X |
| 4,142,702 | 3/1979 | Lamboo | 248/49 X |
| 4,180,286 | 12/1979 | Ginter, Jr. | 285/420 |

FOREIGN PATENT DOCUMENTS 150538 1/1932 Switzerland ............................. 248/49

*Primary Examiner*—Thomas F. Callaghan

[57] ABSTRACT

This invention is a muffler clamp device. It comprises a longitudinal base member, the opposite ends of which are upright and formed to seat the muffler sleeve and the connecting tail pipe end. U bolts are provided encircling the muffler sleeve and the connecting tail pipe end at longitudinally spaced planes. The object of this invention is to clamp the muffler sleeve and tail pipe end separately at longitudinally spaced locations to rigidly support the connecting ends relative to each other and relative to the longitudinal base member.

3 Claims, 5 Drawing Figures